United States Patent
Ayoub et al.

(10) Patent No.: US 6,859,653 B1
(45) Date of Patent: Feb. 22, 2005

(54) EFFICIENT LOCATION MANAGEMENT STRATEGIES IN A UMTS-BASED NETWORK

(75) Inventors: Souhad Ayoub, Huddinge (SE); Michael Andersin, Stockholm (SE)

(73) Assignee: Telia AB, Farsta (SE)

( * ) Notice: Subject to any disclaimer, the term of this patent is extended or adjusted under 35 U.S.C. 154(b) by 0 days.

(21) Appl. No.: 09/830,590

(22) PCT Filed: Nov. 5, 1999

(86) PCT No.: PCT/SE99/02013

§ 371 (c)(1),
(2), (4) Date: Aug. 2, 2001

(87) PCT Pub. No.: WO00/28769

PCT Pub. Date: May 18, 2000

(30) Foreign Application Priority Data

Nov. 9, 1998 (SE) .............................................. 9803825

(51) Int. Cl.[7] .................................................. H04Q 7/20
(52) U.S. Cl. ............................... 455/435.2; 455/456.6; 455/406; 455/414.3; 455/435.1
(58) Field of Search .......................... 455/452.2, 435.1, 455/456.3, 405, 406, 414.3, 456.1, 456.6

(56) References Cited

U.S. PATENT DOCUMENTS

| | | | | |
|---|---|---|---|---|
| 5,915,214 A | * | 6/1999 | Reece et al. ................. | 455/406 |
| 5,978,456 A | * | 11/1999 | Takeuchi et al. ............ | 379/131 |
| 6,058,308 A | * | 5/2000 | Kallin et al. ............. | 455/432.3 |
| 6,101,387 A | * | 8/2000 | Granberg et al. ........... | 455/433 |
| 6,181,940 B1 | * | 1/2001 | Rune ........................ | 455/435.2 |
| 6,212,390 B1 | * | 4/2001 | Rune ........................ | 455/456.6 |
| 6,397,065 B1 | * | 5/2002 | Huusko et al. .......... | 455/435.2 |
| 6,560,460 B1 | * | 5/2003 | Horneman et al. ....... | 455/452.2 |

FOREIGN PATENT DOCUMENTS

| | | |
|---|---|---|
| EP | 0 732 863 | 9/1996 |
| WO | WO 98/30046 | 7/1998 |
| WO | WO 98/36603 | 8/1998 |

OTHER PUBLICATIONS

"Location management strategies for mobile cellular networks of 3rd generation" D. Plassmann; IEEE Pub. No. 0–7803–1927–Mar. 1994.*

* cited by examiner

*Primary Examiner*—William Trost
*Assistant Examiner*—Sharad Rampuria
(74) *Attorney, Agent, or Firm*—Oblon, Spivak, McClelland, Maier & Neustadt, P.C.

(57) ABSTRACT

A mobile telecommunication system in which a plurality of different services can be used, and a method for the location management of mobile stations in a network which uses the mobile system. An efficient location management is achieved for the different services using location management strategies which are independent of each other, instead of associating the location management strategy to the carrier. A location management strategy includes a plurality of location management procedures which have been selected to adapt and optimize the strategy of a specific service, and which procedures that shall be used for the location management are decided by which service the user for the time being wants to utilize, or to which type of subscription the user subscribes.

8 Claims, 4 Drawing Sheets

EFFICIENT LOCATION MANAGEMENT STRATEGIES IN A UMTS-BASED NETWORK

TECHNICAL FIELD

The present invention relates to mobile telecommunication systems, and, particularly, to strategies for location management of mobile stations in such systems.

BACKGROUND OF THE INVENTION

UMTS is a mobile system of a third generation which will be launched in the year 2002. It is a universal system in the sense that the radio network for UMTS (called UTRAN) is intended to be connected to different kinds of core networks (GSM, NSS, ISDN, IP etc).

GSM and NMT are two examples of existing mobile systems (systems of the 2:nd respective 1:st generation) which have been standardised and optimised to in the fist place offer a speech service which in its nature is a real time service. In addition to the speech service there have during the years been launched different data services as complement. The latter, which are using GSM as carrier, is HSCSD and GPRS. These services utilise a large part of the existing GSM-functionality and infrastructure. Both HSCSD and GPRS have more or less their own tailored functionality.

UMTS is, in contrast to the mobile systems of today, intended to offer a lot of different real-time services and non real-time services (both interactive and non-interactive services) with different demands on Quality of Service. This abundance of services and applications calls for new demands on the future system.

In a mobile telecommunication system, mobile stations are movable and have to be located by the network in case of an incoming call. A frequent type of network systems are cellular systems. In such a system the service area consists of cells, where each cell is served by a base station.

The mobile system allows user mobility, which means that a mobile station can transmit and receive data from just any place within the service area. In order to support user mobility a set of specific procedures are implemented in the network system.

These procedures include Handover (HO), which is used to maintain a link between the mobile station and the network when the mobile station (MS) moves in the cellular surroundings. The HO-procedure is performed in active transmission mode in order to provide continuous service, for instance during a call.

Others of these procedures are about the position management, also called Location Management (LM), with the intention to make clear the location of the mobile station within the service area. LM-procedures are performed in non-transmission mode.

The Location Management strategy, also called the LM-strategy, is a plan for location management of the mobile station, and represents an agreement between the mobile station (MS) and the network, which both must be involved in the location management.

The location management is supported by procedures called "paging", or search, and "location update", or updating of location. Paging is a procedure to identify the location of a mobile within a certain paging area. Paging is activated by incoming call and is performed by the network within the paging area.

A paging area consists of one or more cells, the base stations of which transmit the paging message to all mobile stations which are served in these cells, as is shown in FIG. 1. The paging message, which usually is transmitted on the signal channel, loads the system and may cause jamming of radio transmitted information.

Location update is a procedure which is used by the mobile station in order to update the network regarding the location of the mobile station.

The Location Update procedure (LU-procedure) can be initiated by the mobile station, or be forced by the network. The network transmits system information in each cell and, depending on this information, the mobile station can take the initiative to update its location in the network. This is made by a location update message being transmitted from the mobile station to the network, which normally also is made on the signal channel. This procedure is shown in FIG. 2. The location of the mobile station is stored in a special database, a location register, in the network, and the location is represented by a location area. A location area can consist of one or more cells. The location update message is transmitted for instance when the mobile station is moved from one location area to another.

Depending on factors such as the size of the service area, the mobility of the mobile station, and its call frequency, different LM-strategies can be suitable. A number of LM-procedures can be divided into three categories: Area-based procedures, non-area-based procedures, and individual procedures.

An area-based procedure relates to, as is implied by the name, a geographical division of the service area. The easiest way for a network to find a mobile station is to page it over the whole service area. This requires that a paging message is transmitted in each cell in the network. In addition to being the easiest way, it is also the most expensive from a signal point of view. By such a procedure the mobile station need not report its location within the service area. The cost of the paging depends on the size of the service area and the network; the larger service area and network, the more expensive will it be to find the mobile station. This type of procedure is suitable for networks with very limited service areas and with few cells. The procedure also can be usable for network at paging for highly prioritised users. The advantages of such a procedure is that no location register is required, and consequently neither a corresponding database in the network, which will reduce the signal load in the fixed network.

One way to reduce the signal traffic is to divide the service area in smaller parts called paging areas. The network pages the mobile station in one paging area at a time, and when the network only has got a response from the mobile station, the paging procedure is stopped. Even if the introduction of paging areas will reduce the signal traffic, such a procedure will cause not negligible time delay problems in larger networks. By time delay is here meant the period from the transmission of the first paging message until answer has been given from the mobile station. The size of the paging area should be decided with regard to the time delay requirements. Neither for a procedure like this there is any location register required.

In order to reduce the signal load from the network, the service area can be divided into location areas. By the mobile station signalling its location to the network, the network will be kept informed about the movements of the mobile station or current locations. This information is stored in a database. The procedure when the mobile station informs the network about its location is called Location Update (LU). This procedure is initiated and performed by the mobile station based on its geographical location. The mobile station usually listens for messages that the network transmits, and compares current location information with old. When necessary, the mobile station initiates location update, at which information about its new location is given to the network. At incoming call the network knows in which location area the mobile station is, and where it should page. In the case that a location area is the same as a paging area, its size will decide the total signal load for the system. A small location area requires a lot of location updates, and a large location area requires large paging load. Therefore an optimisation of the size of the location area is required, which is made by adaptation of the parameter adjustments of the location area. Performance analyses have shown that an optimal size of a location area depends on the average removal and frequency of incoming calls to the mobile station. This procedure is used in the GSM-system. Such a location management procedure requires a location register in the network.

In order to reduce the paging load, the location area can be divided into smaller paging areas. Such a procedure will reduce the paging load, but will at the same time result in an increase of the time delay.

An alternative, or completing procedure of location management, is to make the mobile station inform the network when it has moved a certain distance from the location which was last reported. Such a procedure can be used in CDMA-based systems (Code Division Multiple Access), such as IS95. In a CDMA-based system, the base stations can be informed about latitude and longitude of the mobile station when it has performed location update. The base station then will become the centre of a circle. The mobile station calculates a distance function based on said latitude and longitude values, and when the mobile station is moved outside the radius of the circle a new location update is performed. That base station that registers the location update will be the new central point. Such a procedure can also be used in other mobile systems by utilising a positioning system like GPS (Global Positioning System).

Procedures which are initiated independent of the geographical surroundings and location areas and paging areas, but yet are general, can be called non area-based procedures. Such procedures can normally be combined with one or more of the area-based procedures described above. This concerns, for instance, registration of whether the mobile station is connected to the network. For that reason the mobile station transmits a location update message each time it is connected or disconnected. This procedure is used in most mobile systems, such as GSM, and prevents to a great extent unnecessary paging from the networks.

Another non-area based procedure for location update is a timer-based procedure. In certain systems, such as GSM, the disconnection procedure is not acknowledged by the network. This means that if a disconnection message has not reached the network, the network does not know it, and in case of an incoming call to the mobile station, the network has to page the mobile station in spite of that it is disconnected. The solution of such a problem can be a time-based location update procedure, which can be called periodic location update. Periodic location update is performed when a timer expires. The mobile station and the network have the same timer values. If the timer expires and no location update is performed, the network will set a flag to disconnected. This procedure is efficient when the battery runs out, or when the mobile station moves to an area which is not covered by the mobile system, and can save a great deal of unnecessary paging. An alternative to timer-based procedures can be network-forced location updates. The network has the possibility to force a location update by transmitting a message to the mobile station and force it to update its location. This procedure can be useful in case when the mobile station during a period of time has been in an area which is not covered by the mobile system, before it returns to the service area.

A third overall group of procedures for location management is based on individual management of the mobile stations. Mobile stations, and their users, differ regarding mobility, frequency of incoming calls, and which applications that are used. A location management procedure with dynamic adjustment of performance parameters therefore is desirable. It is well known that the characteristics of mobile stations varies individually for each mobile station, and varies for an individual mobile station over time and space. Such procedures are memory based and require a database to store the location of the mobile station during a period of time. Algorithms for sophisticated location and estimation of speed can be useful to effect location management procedures.

One way of utilising individual location management procedures is to classify mobile stations based on their mobility, for instance speed, or based on their frequency of incoming calls and the used application. This implies that the location management procedure and its parameter adjustments are adapted to the user's behaviour.

In a case with constant frequency of incoming calls, but with different mobility for different mobile stations, slower mobile stations may require smaller update areas and paging areas than the mobile stations which are moving quicker. A possible solution is to divide mobile stations in two groups with two different sizes of location update areas and paging areas.

Another thing that makes a difference between different mobile stations is the application that is used; it is for instance a big difference between typical speech traffic and data traffic. A voice call is characterised in that a relative constant transmission speed is required, whereas data traffic is more burst like. As is illustrated in FIG. 3, typical data traffic includes periods when no traffic exists. Use of traditional location management in a packet oriented system intended for data transmission can load the system and imply high paging costs. On the other hand data traffic is less sensitive to delay than speech traffic. This problem can be solved by dividing the mobile stations into groups according to their applications. Each group has its own location management strategy.

The location update procedure is always performed in cells at the borders to next location area. Consequently the update traffic of the location requires that extra resources are provided at the bordering cells. A geographical distribution of location update traffic therefore can be of interest. Classification of mobile stations in groups distributes the location management traffic over their cells, where each mobile station or a group and each group has a specific mapping of location areas.

Estimations of optimal performance parameters according to the above can further be developed to include dynamic adjustment of the performance parameters. Especially habitual movements of mobile stations can be utilised for a location management procedure with individual paging areas. By saving the location for each mobile station during a period of time in a special database, the network can calculate the location probability for each mobile station. The mobile station is first paged in the paging areas that have the highest location probability. The probability is estimated on basis of data which have been stored when the mobile station has been in active transmission mode. FIG. 4 illustrates by an example this procedure. X is a person who is living in area A and is working in area B. Area C in between represents the travelling distance from the home area A to the working place area B and back. These three areas A, B, C can be the most probable areas in which to find person X and consequently constitute the highest prioritised paging areas. Depending on which time of the day that an incoming call is coming to X, the paging starts in area A, B, or C. The person Y, on the other hand, is someone who is living and working in the same area D. This area consequently constitutes the highest prioritised paging area, since there is a high probability to find person Y here all over the 24-hour period. The selection of paging areas based on probability of location minimises the paging cost, but may cause problems in time delay sensitive systems.

A third possibility with individual procedures is to utilise a predictive strategy. A lot of mobile stations differ with regard to their mobility. A certain class of mobile stations can have a specific direction with a constant speed over a period of time. At certain points of time, a registration of the location of the mobile station is performed in the network. When this is made, a predictive calculation is performed of the location of the mobile station by the location management database and the mobile station itself. After that, the mobile station regularly compares its current location with the calculated location. If the difference is more than a predefined value, a location update is performed and a new calculation. Based on this predictive location area, the network pages the mobile station. Algorithms for positioning and estimation of speed are usable for a procedure like this which reduces the load as a consequence of paging at the cost of a large need for processor power.

The procedures which have been described above have different advantages and disadvantages. Which location management procedure, based on one of the above mentioned procedures or another procedure, that is best suited for a specific case depends on a plurality of factors. In order to leave as much space as possible in the air interface for the application itself, for instance speech transmission, it will be of greatest interest to minimise the signalling which is made in the location management. Another important, and sometimes contradictory, aspect is the demand for low time delay which can occur as a consequence of paging in a plurality of paging areas. Further, certain advanced procedures may require sophisticated and expensive equipment in the fixed parts of the networks, in form of hardware and software.

In order to optimise the location management, the mobile systems make use of a location management strategy which can be based on a plurality of procedures. The GSM-system, for instance, makes use of a strategy which is suitable in the first place for speech traffic, for which the system principally is created. As has been mentioned above, this strategy includes a procedure which utilises location areas, but also procedures for connection and disconnection and a timer-based procedure. This location management strategy is associated to the carrier, i.e. the GSM-system.

For data transmission there is a patent-oriented system called GPRS (General Packet Radio Service) which uses GSM as carrier. As far as location management is concerned, a procedure, however, has been added which will make GPRS more suitable for data transmission. Mobile stations are divided into two groups depending on their mobility status "Ready" and "Standby". A mobile station with mobility status "Ready" has a cell as paging and location area, whereas a mobile station with the mobility status "Standby" has a larger area including a plurality of cells as paging and location area. A third status called "Idle" also exists, corresponding to something like non-active transmission mode for GSM. Change of status for a mobile station can be forced or initiated by a timer expiring. All data services which are intended to be used with GPRS as carrier will, according to the standard, make use of the same type of location management strategy, in spite of the fact that these data services among themselves can be very different with regard to quality requirements and traffic behaviour.

Another system for data transmission is HSCSD (High Speed Circuit Switched Data) which also uses GSM as carrier. This system, however, uses the same location management as GSM.

PROBLEMS WITH KNOWN TECHNOLOGY

As far as UMTS is concerned, it is still unclear which location management strategy or location management strategies that will be used. Definitely, however, UMTS will offer a large number of services of different types, both real-time and non real-time services, interactive and non-interactive services. To optimise a location management strategy which shall be put into practice with all these services is not to be made in a simple way. The alternatives is to select one or several main service/services for which the strategy is optimised, such as for speech GSM, or to allow all services to be given equal value, at which probably no service will have optimal location management. This is the disadvantage with associating the location management strategy to the carrier. Utilisation of "smart" calculating location management procedures, for instance with individual paging areas or predictive location management as above, can reduce the signal load on the radio network. These procedures, however, imply a higher cost for necessary processor power. This cost will affect all users and subscribers, in spite of the fact that a majority of these users perhaps will not have any improved service at all by the advanced procedures.

The risk consequently is great that a location management strategy that shall manage all services in a UMTS-system will result in inefficient location management for certain services, or the mobile stations which utilise these services. The consequence will be an unacceptable high signal load which can result in jamming in a signal channel, which in the end will limit the radio resource which can be used for the information transmission itself.

Further, it is not possible, with known technology, to associate the cost for the location management to specific users or subscribers. This would be desirable, as sophisticated and expensive location management procedures which in some sense have to be paid by all users, perhaps will only benefit a few.

AIM OF THE INVENTION

It consequently is the aim of the invention to eliminate disadvantages of known technology. More particular, it is an aim to provide an efficient location management strategy for a mobile system within which a plurality of different services can be utilised.

Further, it is an aim to make possible the fixing of price of the location management, as it is utilised by users and subscribers.

SUMMARY OF THE INVENTION

The invention fulfils said aims by associating a location management strategy to a service, including both application and Quality of Service, instead of to the carrier. The location management strategy consists of a plurality of proceedings or procedures for location management. Which procedures that shall be used are decided by which service the user at the moment wants to utilise, or which kind of subscription the user subscribes to.

When a plurality of services are going on at the same time, for instance at multimedia calls, different procedures can be combined, or some be excluded. When real-time and non real-time services are utilised at the same time, it is sufficient to make use of that set of location management procedures that is valid for the real-time services. The location management consequently is associated to the service and/or to the subscription. The user can subscribe to one or more services, and directly or indirectly to a location management strategy belonging to just that service. By this procedure a signalling gain is achieved as the location management strategies are adapted to the service and to the user himself/herself. Further, a fixing of price of the location management is made possible.

DETAILED DESCRIPTION OF EMBODIMENTS

Figure 1:
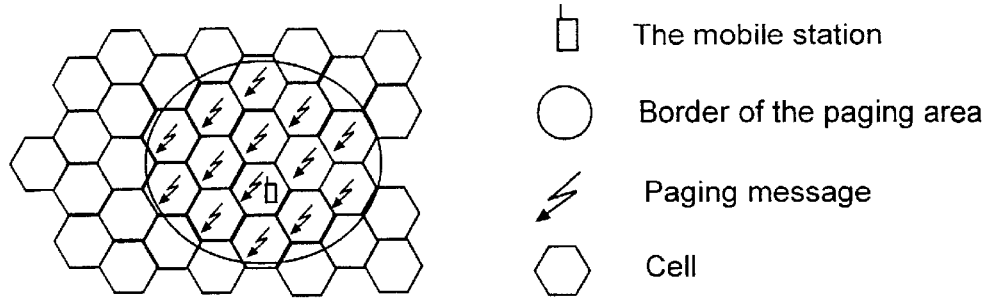
FIG. 1 shows schematically paging of a mobile station in a paging area in a cellular system.
Figure 2:
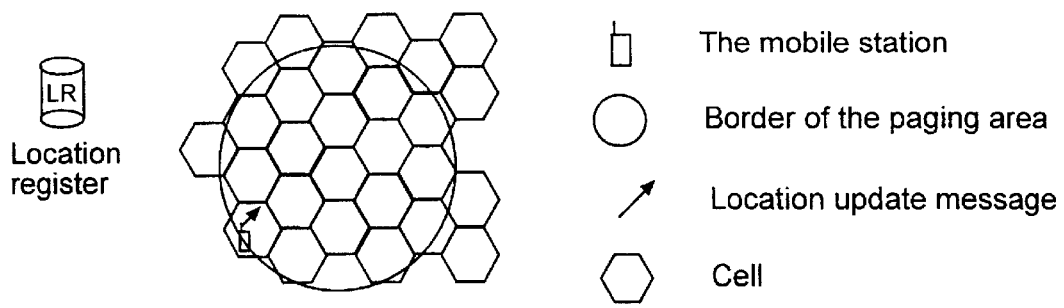
FIG. 2 shows schematically a location area and a location update message from a mobile station in a cellular system.

The invention relates to a mobile telecommunication system in which a plurality of services can be utilised. Such a system can use the radio network as transmission medium. Such a system can be UMTS. The invention relates particularly to the Location Management of mobile stations in a network which supports UMTS. The location management in mobile systems are normally performed in active non-transmission mode, and principally consists of two parts; paging and location update.

Paging is performed by the network in order to find the location of a mobile station within the service area of the network, for instance in case of incoming call.

Location update is the procedure of the mobile station to inform about its location within the service area to the network. Such a procedure can reduce the signal load on the network since the network has at least a rough estimation of the location of the mobile station within the service area when paging shall be performed.

Both paging and location update loads the system since these procedures include signalling over the network and by that occupies a radio resource which can be used for information transmission. The location management can, in addition to these two parts, include further procedures, such as registration to the network when a mobile station is connected or disconnected. This is a simple procedure which results in that a great deal of location management signalling, i.e. paging messages and location update messages can be avoided. There exist a number of other procedures with the aim to reduce the location management signalling but which results in other costs, such as a need for great processor power in the network.

A large number of procedures to perform the location management are possible, of which a number have been described above. Important factors to consider when location management procedure shall be selected is for instance signal load, time delay, and need for processor power in the network. These factors are depending on a plurality of parameters, such as the size of the network, type of service (both application and quality), and the mobility and call frequency of mobile stations. The set of procedures which are used for the location management within a mobile system constitutes the location management strategy of the system.

UMTS shall offer a plurality of services of quite different kinds, both real-time and non real-time services, interactive and non-interactive services. A location management strategy which is associated to the system, as in the mobile systems of today, within which the same location management procedures are used for all services, will imply a compromise. A location management strategy which is optimised for speech traffic, as for instance within GSM, can for a data transmission be less efficient. The consequence may be an unnecessary load on the network as a consequence of an exaggerated location management signalling which might have been avoided if a location management procedure suited for the current service had been utilised. Further, different types of data transmission services might require essentially different location management procedures to make minimal encroach by the signalling on the radio resource that can be used for data transmission.

One embodiment of the present invention offers a solution of these problems by associating the location management to the services instead of to the carrier. In a mobile system which offers a plurality of services of different kinds, such as UMTS, each service will, according to the invention, have an own location management strategy which is directly adapted for this service. The functionality for the location management will in such a system not be optimised for one single service as in the case NMT and GSM. As a consequence of this, the system will have a possibility to efficiently manage a plurality of different services at the same time.

The invention offers a substantial increase of efficiency of the location management in a mobile system intended to manage a plurality of different types of services. By adapting and optimising a location management strategy to a specific service, the signalling which has to be performed at for instance paging and location update, can be reduced. In addition to that the invention makes it possible for the system to use different location management for speech traffic and for data traffic, which normally are essentially different, also different types of data transmission traffic can be individually dealt with.

Figure 5:
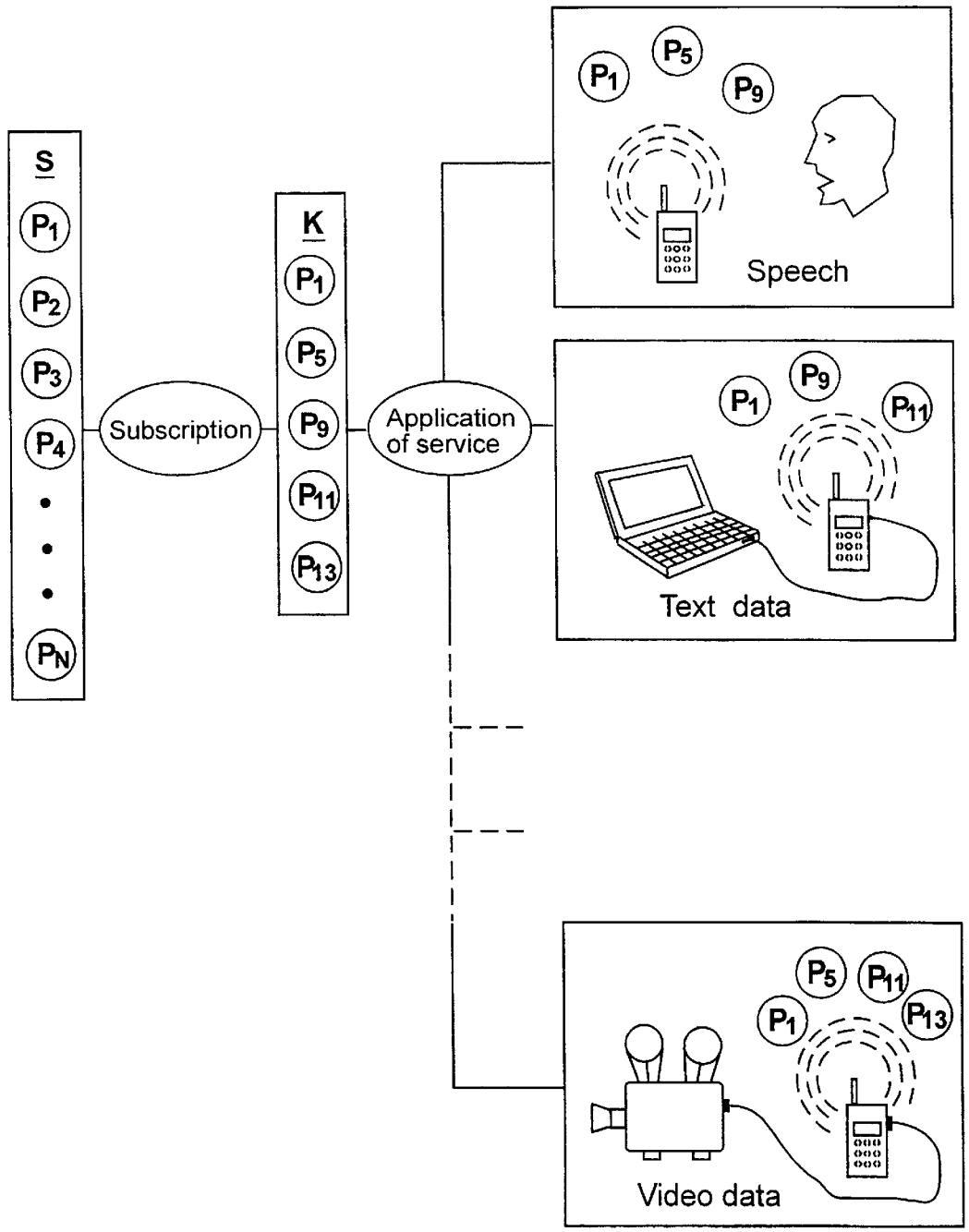
FIG. 5 is a block diagram which illustrates a method according to an embodiment of the invention.

In FIG. 5 is shown as a block diagram an embodiment of the invention. The figure is intended to illustrate how the invention can be applied to a mobile system intended to handle a plurality of different kinds of services, such as UMTS. Adaptation of a location management strategy to a specific type of service constitutes a part of the invention, however not how it is performed. GSM is for instance adapted to speech traffic, whereas GPRS is adapted to "burst-like" data traffic. Such an adaptation, or optimisation, is not only dependent on the type of service, but also of, for instance, the size of the network, number of users in the network etc.

For a given network which uses a mobile system containing a plurality of different services, there is to each service a location management strategy associated which is built up of one or more location management procedures. These procedures are based on different location management procedures, several types of which have been described above. Several of these procedures can be used within a plurality of strategies for different services.

In FIG. 5, S is an operator, or seller, for a network which uses a mobile system which includes a plurality of different services. The mobile system can be UMTS. To these different services belong, for each of them, an especially adapted location management strategy. These location management strategies are built up of one or more location management procedures P. A location management procedure can be included in the location management strategy for a plurality of services.

A user K, or buyer, selects to subscribe to one or more services from the operator S. As an example, the user K may want to utilise his/her subscription for speech transmission and an e-mail functionality. On the other hand, he/she perhaps has no need to utilise other kinds of services, such as fax or reading of www-pages, and therefore neither is interested in paying for these possibilities. The figure intends to show that the user K establishes a subscription for a specific set of services, and indirectly for corresponding set of location management strategies. These consist totally of a number of location management procedures $P_1, P_5, P_9, P_{11}$, and $P_{13}$, to which the user/subscriber K by that will have access.

When the user K utilises a service he/she subscribes to, that location management strategy which belongs to the service in question is used. In the example in FIG. 5 is illustrated for example that K can use his/her subscription for speech transmission, at which the location management strategy consists of the location management procedures $P_1$, $P_5$, and $P_9$. A second exemplifying service is transmission of text data, for instance e-mail, which utilises a somewhat different location management strategy. A service which implies transmission of video data is also shown. Several different kinds of video services, however, are possible, depending on whether communication is made in real-time or not, and if it is made interactively.

The location management is an agreement between the user's mobile station and the network. If different location management strategies shall be used for different services, there is in some cases required that information about which type of service/strategy that is in question can be transmitted between the mobile station and the network. Such transmission of information is, as a suggestion, transmitted over the signal channel which also is used for paging and location update, but can also be transmitted in other ways.

Example of some different types of services which can be included in a system according to the invention, and characteristics of their location management strategies are:

For real-time services such as speech one can make use of a location management strategy similar to that which is used for, and is associated with, GSM.

For a pure paging service, like a pager service, a specific strategy is needed since the mobile station not necessarily makes location update to the network. Paging then must be made in the service area of the whole network.

A location service is possible, by which the mobile station can inform the network where it is, by means of a specific location management strategy. Such a service can for instance be used for taxi and haulage contractor activity.

Figure 3A:
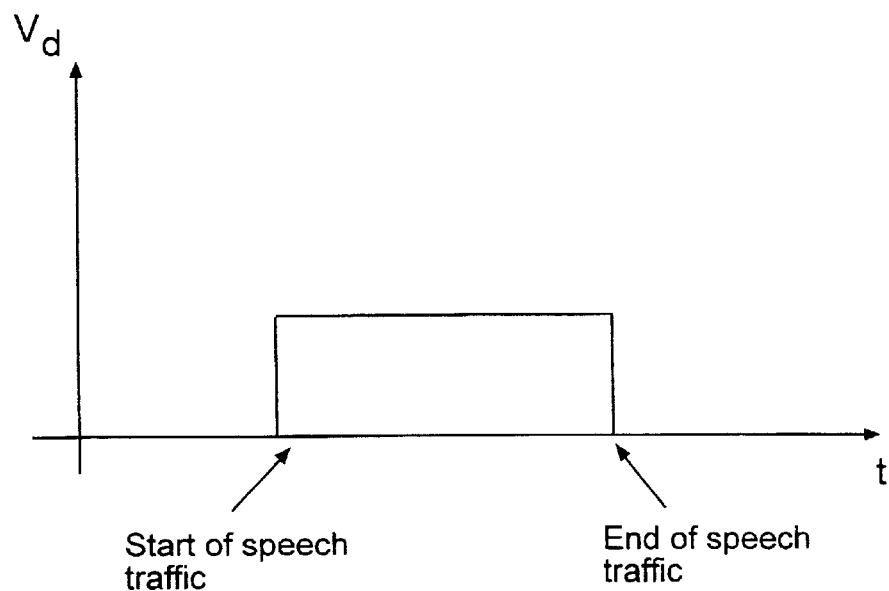
FIG. 3 illustrates by two examples the data transmission speed $v_d$ as function of the time t for typical speech traffic and typical data traffic.
Figure 3B:
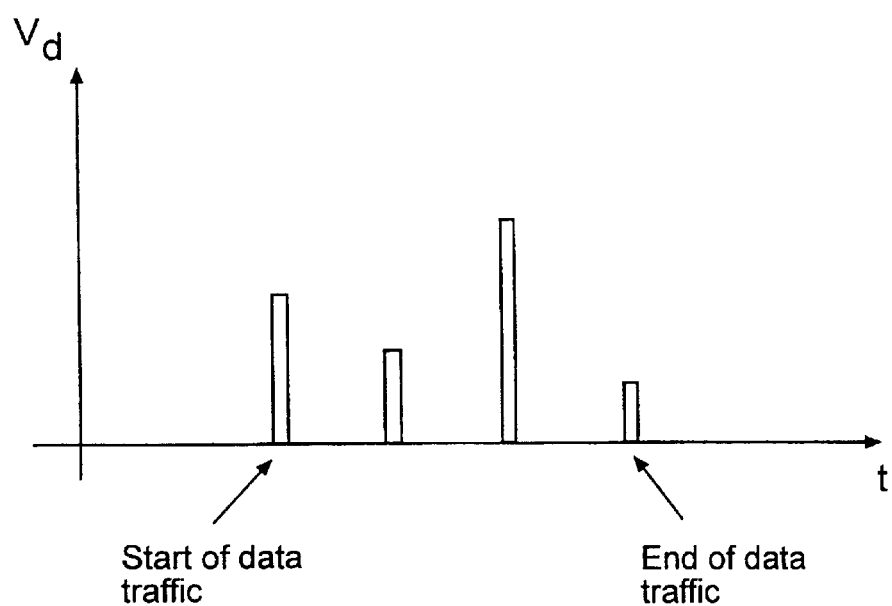
Figure 4:
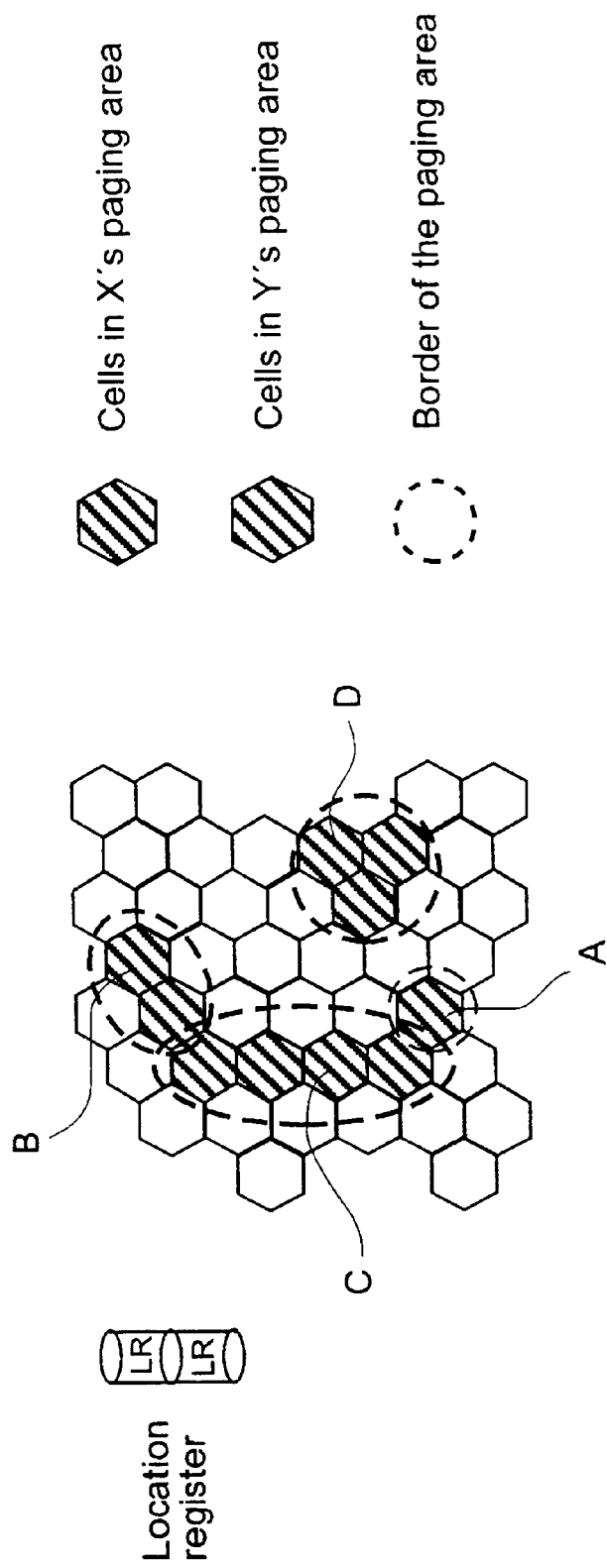
FIG. 4 illustrates a location management procedure with individual paging areas.

For different packet services, for instance transmission of compressed and packet-arranged data, different types of location management strategies may be needed. These can depend on the traffic behaviour of the services, as is illustrated in FIGS. 3a and 3b, but also on their interactivity.

When a plurality of services are in action at the same time, for instance at multimedia calls, the procedures which are included in the strategies of respective services can be combined, or certain procedures be excluded. If one, for instance, has both real-time services and non real-time services going on at the same time, it can be sufficient to make use of the set of location management procedures that apply to the real time services.

A mobile system according to the invention makes possible a differentiation of the form of subscription; a user can himself/herself select which types of services he/she wants to use and subscribe to/pay for only these. The subscriptions in this way can be tailored for the users to a larger extent than in the systems of today, where the available service offering for the most part is decided by how advanced the mobile station is.

Further, a fixing of the prices of the location management is made possible. Even if it is an aim of the invention to reduce the signal load due to the location management, certain procedures will give higher load than others, depending on which demands that are called for by the different services. Procedures which result in higher load can by that also result in a higher price for the subscriber.

In another embodiment the invention can be utilised without subscription. This can be made according to known technology by use of cash card, which gives the buyer service up to the paid sum, and a telephone number. By, at the purchase of such a card, specify which services that shall be included, the buyer's mobile station can, via its telephone numbers, be given access to the strategies which are best suited for the selected services. In that way an efficient location management with possibility to reduced signal load in relation to known technology is achieved.

The invention relates to making the location management of a mobile station in a mobile system which offers a plurality of services of different kinds more efficient. Instead of associating the location management strategy to the carrier, i.e. to use the same set of location management procedures for all services within the mobile system, each service has an independent strategy for location management associated to it. Several embodiments of the invention have been described above, and a plurality of apparent modifications and variants are discernible. The aim is that all such modifications and variants are included in the invention, provided that they are within the scope of the appended patent claims.

What is claimed is:

1. A method of location management of mobile stations within a network of a mobile telecommunications system, comprising the steps of:

providing a plurality of subscription services and a plurality of location management strategies, each location management strategy corresponding to one of the plurality of subscription services;

subscribing to one or more of the plurality of subscription services;

transmitting subscriber mobile location information according to a location management strategy corresponding to a subscribed service; and fixing a price of a subscription dependent on the used location management strategy.

2. The method for location management of claim 1, wherein each of the plurality of location management strategies comprise:

a corresponding location management procedure.

3. The method for location management of claim 1, wherein the mobile telecommunications system comprises:

a telecommunication system which uses a radio network as a transmission medium.

4. The method for location management of claim 1, where the plurality of subscription services comprise at least one of:

a real-time subscription service;

a non real-time subscription service;

an interactive subscription service; and a non-interactive subscription service.

5. A mobile telecommunication system, comprising:

a network operator configured to provide a plurality of subscription services and a plurality of location management strategies, each location management strategy corresponding to one of the plurality of subscription services; and a subscriber configured to subscribe to at least one of the subscription services, and to transmit subscriber location information according to a location management strategy corresponding to the subscribed service, wherein the network operator is further configured to fix a price of a user subscription on the basis of the location management strategy corresponding to the subscribed service.

6. The mobile telecommunication system of claim 5, wherein the location management strategies comprise:

a corresponding location management procedure.

7. The mobile telecommunication system of claim 5, comprising:

a telecommunication system which uses a radio network as a transmission medium.

8. The mobile telecommunication system of claim 5, wherein the plurality of subscription services comprise at least one of a real-time subscription service;

a non real-time subscription service;

an interactive subscription service; and a non-interactive subscription service.

* * * * *